Figure 1:
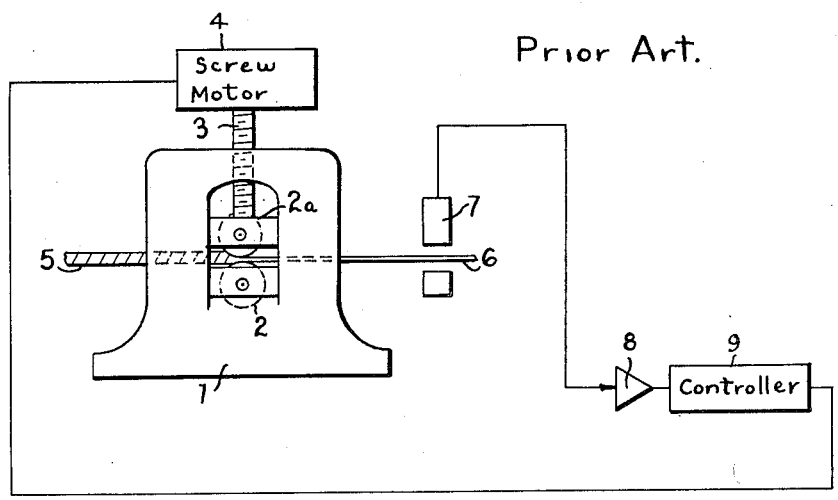

Nov. 24, 1964     K. G. HUNTLEY     3,158,049

AUTOMATIC GAUGE CONTROL SYSTEMS

Filed Sept. 21, 1961

Nov. 24, 1964  K. G. HUNTLEY  3,158,049
AUTOMATIC GAUGE CONTROL SYSTEMS
Filed Sept. 21, 1961  2 Sheets-Sheet 2

United States Patent Office 3,158,049
Patented Nov. 24, 1964

3,158,049
AUTOMATIC GAUGE CONTROL SYSTEMS
Keith Gordon Huntley, Dukeswood, Gerrard Cross, England, assignor to Rank Precision Industries Ltd., London, England, a British company
Filed Sept. 21, 1961, Ser. No. 139,788
4 Claims. (Cl. 80—56)

This invention relates to systems for automatically controlling the gauge of a material produced in longitudinally extending form such as strip, sheet, or wire, and constitutes a continuation-in-part of the invention as disclosed in my co-pending application Serial No. 769,731, filed October 27, 1958, and now abandoned.

Various systems of automatic control based on a servo-loop operation have been suggested for the above purpose. They are generally designed to increase or decrease the forming effort according to whether the gauge of the material emerging from the forming means, or gauge defining device such as rolls, dies, etc., tends to increase or decrease.

Taking a strip-mill installation as an example, the gauge or thickness of the material emerging from the rolls of the mill may be continuously sensed by gauge sensing means to derive an electrical signal therefrom which is ineffective as long as the gauge is within predetermined limits defining a tolerance band and which, when said limits are exceeded, controls the rolling pressure so as to counteract the departure from the set value and restore the gauge to within the tolerance band.

It will be appreciated that in the above arrangement a certain time lag must occur between the error being sensed and the required corrective action being applied. This lag is due, in the main, to the inevitable spacing which must be maintined in practical installations between the sensing means and the point of application of the rolling effort, i.e. the roll pinch. The spacing can be reduced to a minimum but cannot be entirely eliminated in conventional installations at present in use.

At high rolling speeds the effect of the lag referred to is not very pronounced. But, as the speed drops, overcorrection and instability inevitably set in since the maintenance of a constant servo-loop gain in terms of the rate at which the total correction in response to a given error is applied must necessarily mean that correction is effective for too long a time before the gauge sensing means is able to evaluate it, with the result that the servo-loop response, in terms of correction applied in response to a given error, varies with rolling speed.

The major object of the present invention is to provide a system for automatically controlling the gauge of a material produced in longitudinally extending form, such as strip, sheet, wire, and the like, in which the loop response as hereinbefore defined is as good at low as at high speed, by virtue of the same correction being applied in response to a given error whether the material is produced at a high or at a low rate.

A further object is to provide a system as hereinbefore set forth in which the gain of the servo-loop automatically controlling the gauge is made directly proportional to the rate at which the material is produced.

It is still a further object to provide a strip-mill installation in which the gauge of the strip is automatically maintained within a tolerance band through a wide range of rolling speeds.

According to one basic feature of the present invention there is provided a system for automatically controlling the gauge of a material produced in continuous longitudinally extending form by passing it through a gauge defining, forming device regulatable through the operation of power means comprising: gauge sensing means responsive to the gauge of the material emerging from said gauge defining device; controller means responsive to said gauge sensing means for regulating said power means so as to regulate said gauge defining device with a servo-loop action enabling a correction to be applied to the gauge of the emerging material tending to maintain said gauge within predetermined limits defining a tolerance band; and means for controlling the rate at which correction is applied in response to a given gauge error outside the tolerance band so that said rate is proportional to the speed of the material and inversely proportional to the speed of operation of the power means; whereby to counteract the effect of transportation lag and thus maintain a servo-loop response in terms of correction applied in response to a given error substantially unaffected by the speed of the material over a wide range thereof.

The invention will now be described, by way of example only, with reference to the accompanying diagrammatic drawings.

Figure 2:
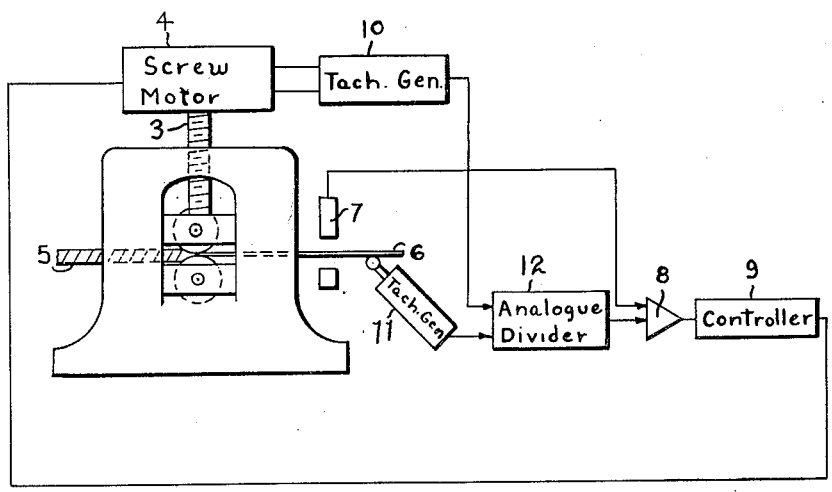
Figure 3:
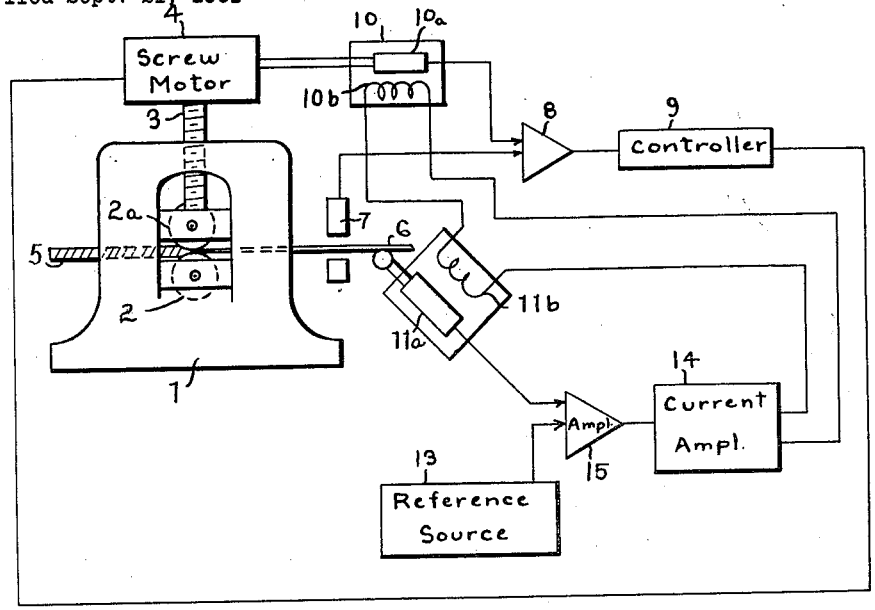
Figure 4:
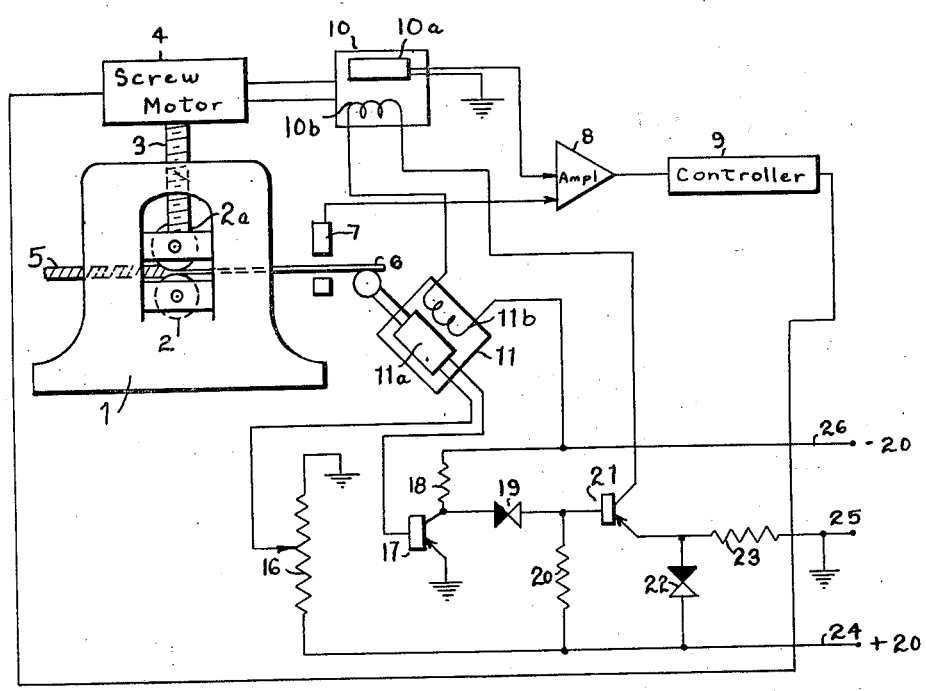

FIG. 1 is a schematic representation of a basic known strip-mill layout with automatic gauge control.
FIG. 2 is a view of a first embodiment of the invention.
FIG. 3 is a view of an elaboration of FIG. 2.
FIG. 4 is a simplification of FIG. 3 and forms the preferred embodiment.

The invention will be described as applicable by way of example to a strip-mill installation, it being clearly understood, however, that the scope thereof extends to installations for the production of continuous material reduced to the required form by any suitable forming tool or gauge defining device such as a die or the like.

For a clearer understanding of the invention reference is made, in the first instance, to a known arrangement diagrammatically represented in FIG. 1, wherein a strip-mill generally indicated at 1 comprises a lower roll 2 rotatable around an axis fixed in space and an upper roll 2a rotatable around an axis displaceable in a vertical plane through the action of a lead screw 3 rotated in one or other direction by a reversible screwmotor 4.

The strip is fed between the rolls and its thickness is reduced thereby to a value corresponding to the spacing between the rolls, the ingoing section of the strip being represented at 5 and the outgoing section at 6.

Due to a number of possible variations in the ingoing strip, such as variations in density, temper, hardness, etc., the maintenance of constant screw pressure on the upper roll 2a does not necessarily ensure a constant thickness of the outgoing strip. In order to provide automatic adjustment of the screw pressure to counteract said variations, the thickness of the outgoing strip is continuously sensed by a thickness gauge 7 which generates an electrical signal varying in accordance with eventual thickness variations and the output of thickness gauge 7, through amplifier 8, is caused to operate a controller 9, such as relay controller, the function of which is to switch the screwmotor 4 in the direction as required for the correction called for.

It will be appreciated that, in the above arrangement, after the thickness gauge has detected an error exceeding a predetermined tolerance and caused the screwmotor 4 to rotate in the direction tending to apply corrective action, some time must elapse before the thickness gauge can evaluate the correction in terms of actual strip thickness. The delay, referred to in the art as transporation lag, is in fact the time taken for the strip to travel from the "pinch" between the rolls to the thickness gauge.

The transportation lag, which seriously affects the response of the servo-system in a manner presently to be seen, can be minimized by placing the thickness gauge as near as possible to the rolls, but cannot be eliminated entirely for a number of practical reasons such as the finite and usually large diameter of the rolls.

In the arrangement of FIG. 1, the thickness gauge signal is relied upon to turn on and off the controller. This means that the screwmotor will be on from the moment the operative error is detected (if a small delay due to sluggishness of the system generally is ignored) right through the transportation lag to the time in excess of said lag when the correction as detected by the thickness gauge has reached a value corresponding to the turning off point of the controller. By the time the controller is actually switched off and the screwmotor has come to rest after some overrun, the correction which has actually taken place at the rolls is grossly in excess of that called for by the error assuming that a fall in strip speed has occurred from the initially set value. The greater the increased transportation lag thus involved, the greater the likely over-correction.

Total correction in terms of thousandths of an inch displacement of the upper roll in response to a given error in an arrangement such as depicted in FIG. 1, i.e. servo-loop response, is proportional to the rate of turning of the screwmotor and inversely proportional to strip speed. The lower the strip speed, and consequently the longer the transportation lag, the more likely is the screwmotor to run up to speed instead of being cut off somewhere at the acceleration stage.

It will be seen therefore that, assuming the installation to give a satisfactory servo-loop response in terms of actual correction for a given error at one strip speed, it will grossly over-correct at a much lower speed.

The embodiments of the invention in the ensuing description eliminate the serious drawback referred to hereinabove in connection with the prior art represented by FIG. 1 and enables a response to be secured which is as good at low as at high strip speed.

Referring to FIG. 2, which depicts diagramamtically a first embodiment of the invention, provision has been included for eliminating the possibility of over-correction as strip speed decreases and, consequently, transportation lag increases. The provision consists in deriving a negative feedback signal for the servo-loop which is proportional to the screwmotor rate and inversely proportional to the strip speed and using said signal to reduce the loop gain which thus tends to cancel the gauge signal for the purpose of turning off the controller to an increasingly greater rate as the speed of the strip decreases.

It will be noted that in this manner the feedback signal is actually proportional to the correction which would be applied by the arrangement of FIG. 1, but since it is used in the embodiment in a manner tending to restrain the correction, a substantially constant loop response is achieved regardless of strip speed by reducing in fact the loop gain, i.e. the rate of correction for a given error, as the strip speed decreases.

In FIG. 2, the references of FIG. 1 have been retained for like parts. The additional parts are screwmotor tachometer 10, in the form for instance of a rotary generator having its shaft coupled to the screwmotor shaft or to a drive therefrom, strip tachometer generator 11 having its shaft rotated, for instance, by a passline roller in turn rotated by the passage of the strip thereon, and analogue divider 12. The rate signal from tachometer 10 divided by the rate signal from tachometer 11 emerges from the analogue divider 12 in the form of a feedback signal which is proportional to screw rate and inversely proportional to strip rate. This feedback signal is injected in amplifier 8 in such manner as to cancel the action of the signal issuing from gauge 7 so as to turn off the controller 9 at increasingly greater rate as the speed of the strip decreases.

When controller 9 is turned off, screwmotor 4 tends to come to rest with result that the feedback signal emerging from analogue divider 12 is no longer effective in cancelling the gauge signal thus allowing the controller to come on again and the screwmotor to run. The screw rate signal now builds up, and the sequence is repeated. It will be observed, therefore, that when the strip has reached a certain relatively low speed, the controller will be switched off-and-on a number of times in the course of a correction responsive to a given error. In other words, the correction is spread over a number of bursts so that the rate at which correction in response to a given error is applied is decreased relatively to the conditions obtaining at higher strip speed.

Conversely, as the strip speed increases, the number of bites become smaller and smaller until a speed is reached when correction is applied at a high rate in a single bite.

Controller 9 may take various forms of construction. However, one suitable construction is more particularly disclosed in my co-pending application Serial No. 769,497, filed October 24, 1958.

The analogue divider 12 need not be a physical unit as long as the feedback signal derived from tachometer 10 and tachometer 11 fulfills the stated requirement. Division may be arranged by interaction between the two tachometers in such manner as to derive the desired feedback from the armature of one of the tachometers. This is in fact shown in FIG. 3.

In FIG. 3, the feedback signal is taken from the armature 10a of screwmotor tachometer 10 so that for any given value of the current in the field winding 10b the voltage output is in any case proportional to screwmotor rate. The field winding 10b of tachometer 10 is connected in series with field winding 11b of tachometer 11, the two windings being fed from a current amplifier 14 driven by a comparator amplifier 15 receiving two inputs, one input from the armature 11a of tachometer 11 and one input from reference source 13. At any one strip speed value, the action of the loop thus formed is to allow a current to flow in the field windings which makes the output from tachometer 11 fed into amplifier 15 equal to the reference potential. It is clear that at low strip speed much more current will have to flow through the field winding 11b to make up the voltage in tachometer 11 than at a high speed. Thus, the current in the field windings 10b and 11b is inversely proportional to strip speed and likewise the output from tachometer 10 must be inversely proportional to strip speed, besides being proportional to screwmotor rate.

FIG. 4 represents a further simplification which obviates the need for comparator amplifier 15 in securing the feedback signal in the manner illustrated in FIG. 3.

In FIG. 4, the output from the armature 11a is fed to the input of grounded-emitter transistor 17 in series opposition with a reference voltage appearing across a tapped portion of resistor 16 having the ends thereof connected to supply terminals 24 and 25 respectively, the latter terminal being grounded.

The output of transistor 17 is coupled to the input of transistor 21, the collector circuit of which includes fields 10b and 11b in series.

It will be observed that transistor 17 is D.C.-coupled to transistor 21 through Zener diode 19. This is conventional practice when it is desired to drop the D.C. level from that obtaining at the output of an amplifying stage to that required at the input of the following stage without introducing appreciable signal attenuation particularly at very low signal frequency. It is well known in the fact that the impedance of a Zener diode under proper reverse current conditions is very low. Both diode 19 and diode 22, the latter providing a fixed voltage for the emitter of transistor 21, are intended to operate under such conditions.

The action of the Zener diode is such that little current can flow through the device in the reverse direction until the breakdown voltage—or Zener voltage—is reached when a steep current rise takes place with a very clean action while the voltage across the diode remains practically constant for any value of current up to the maximum rating.

In order to establish the correct operating point on the steeply rising portion of the current curve, a voltage somewhat in excess of the breakdown voltage must be applied. This is usually taken care of by connecting the device to a source of potential through an impedance of suitable value.

In FIG. 4 the operating point for diode 19 is governed by the value of load resistor 18 in series with resistor 20. In actual practice, load resistor 18 would be chosen for its specific load function and resistor 20 would be adjusted to allow the required standing current through diode 19. As a result of the action of diode 19, the collector voltage of transistor 17 differs from the base voltage of transistor 21 by the Zener voltage drop across 19. The diode does not attenuate the signal to any appreciable extent since its impedance around the operating point is very low as already indicated.

In the case of Zener diode 22, its operating point is governed by the value of resistor 23, the series connection of diode 22 and resistor 23 across supply points 24 and 25 forming in effect a potential divider configuration in the same manner as the series connection of load resistor 18, Zener diode 19 and resistor 20 across supply points 24 and 26 forms another potential divider. The potential at the emitter of transistor 21 is fixed at all times to the Zener voltage of diode 22, while the potential or D.C. level at the base under quiescent conditions is fixed by the action of Zener diode 19 and associated resistors. The parameters of the two effective potential dividers are chosen so as to establish a potential difference between emitter and base which will drive a bias current from terminal 24 along the path: diode 22, emitter to base of transistor 21, diode 19, resistor 18, terminal 26. The bias current is chosen so as to maintain a given collector current through fields 10b and 11b when armature 11a is stationary.

In operation, the tapping on resistor 16 is adjusted so that when the armature 11a is stationary, transistor 17 is near the cut off point, i.e. the base is somewhat positive to ground. As soon as the armature begins to rotate, a voltage is generated therein which opposes the cut-off bias. This increases the collector current through load resistor 18 and tends to make the collector less negative. Consequently, the base of transistor 21 becomes less negative. Since the emitter of transistor 21 is at a potential which is fixed by Zener diode 22, the net result is a lowering of the potential difference between emitter and base and therefore a decrease of the bias current. As the bias current falls, the collector current falls and the fields energization is decreased. The fields are gradually weakened as the speed of the strip increases since the output of armature 11a will tend to overcome the reference voltage as long as the strip is accelerating. It can never increase substantially above the reference voltage, however, because of the accompany weakening of the field 11a. The reverse action takes place should the armature output tend to fall below the level of the reference voltage.

In this manner the second requirement for the feedback signal emerging from armature 10a, i.e. that it shall be inversely proportional to strip speed, is satisfied.

Although the circuit parameters can be varied within the scope of the invention in a manner which is clearly manifest to the skilled in art, the following have been found satisfactory in practice:

*Resistors*

| | | |
|---|---|---|
| 16 | kilo-ohms | Approx. 4 |
| 18 | do | Approx. 1.8 |
| 20 | do | Approx. 3.9 |
| 29 | ohms | 230 |

*Transistors*

| | |
|---|---|
| 17 | OC470 |
| 21 | 2N268 |

*Zener Diodes*

| | |
|---|---|
| 19 | Z8 (two in series). |
| 22 | ZL7. |

*Supplies*

Terminal 26—20 volts negative with respect to grounded terminal 25.

Terminal 24—20 volts positive with respect to terminal 25.

I claim:

1. In a system for automatically controlling the gauge of a material produced in continuous longitudinally extending form by passing it through a gauge defining forming device regulatable through the operation of power means, the combination comprising, a servo loop including gauge sensing means responsive to the gauge of the material emerging from said gauge defining device to produce an electrical gauge signal proportional to said gauge, an amplifier for said gauge signal, and an electrical controller responsive to the amplified gauge signal for regulating the speed of said power means so as to regulate said gauge defining device with a servo-loop action enabling a correction to be applied to the gauge of the emerging material tending to maintain said gauge within predetermined limits defining a tolerance band, first electrical means responsive to the speed of operation of said power means, second electrical means responsive to the speed of the emerging material, means producing a rate modifying signal proportional to the ratio of said first electrical means to said second electrical means, and means applying said rate modifying signal as a negative feedback in said servo-loop from said electrical controller to said power means thus tending to reduce the loop gain whereby the rate at which correction is applied to the gauge of the material in response to a given error outside the tolerance band is made proportional to the speed of the emerging material and inversely proportional to the speed of said power means thereby to counteract the effect of transportation lag.

2. A system as claimed in claim 1, wherein said means producing said rate modifying signal is constituted by an analogue divider having said first and second electrical means as numerator and denominator inputs respectively.

3. In a system for automatically controlling the gauge of a material produced in continuous longitudinally extending form by passing it through a gauge defining forming device regulatable through the operation of power means, the combination comprising, a servo loop including gauge sensing means responsive to the gauge of the material emerging from said gauge defining device to produce an electrical gauge signal proportional to said gauge, an amplifier for said gauge signal, and an electrical controller responsive to the amplified gauge signal for regulating said power means so as to regulate said gauge defining device with a servo-loop action enabling a correction to be applied to the gauge of the emerging material tending to maintain said gauge within predetermined limits defining a tolerance band, a first tachometer generator having an armature drivingly connected to said power means and a stationary field, a second tachometer generator having an armature drivingly connected to said material produced and a stationary field, a source of reference potential, a current amplifier for feeding the field of said first tachometer in series with the field of said second tachometer, a comparator amplifier for producing a drive for said current amplifier in response to the difference between an input derived from the armature of said second tachometer and an input derived from said source of reference potential, and a coupling from the armature of said first tachometer to the input of the amplifier of said gauge signal for conveying a negative feedback signal proportional to the ratio between the power means speed and the material speed, said feedback signal tending to cancel the action of the gauge signal and thus causing the controller to be turned off and on so as to control the rate at which said correction is applied in a manner inversely proportional to the power means speed and directly proportional to the material speed, whereby to counteract the effect of transportation lag and thus maintain a servo-loop response in terms of correction applied in response to a given error substantially uneffected by the speed of the emerging material over a wide range thereof.

4. In a system for automatically controlling the gauge of a material produced in continuous longitudinally extending form by passing it through a gauge defining forming device regulatable through the operation of power means, the combination comprising, a servo loop including gauge sensing means responsive to the gauge of the material emerging from said gauge defining device to produce an electrical gauge signal proportional to said gauge, an amplifier for said gauge signal, and an electrical controller responsive to the amplified gauge signal for regulating said power means so as to regulate said gauge defining device with a servo-loop action enabling a correction to be applied to the gauge of the emerging material tending to maintain said gauge within predetermined limits defining a tolerance band, a first tachometer generator having an armature drivingly connected to said power means and a stationary field, a second tachometer generator having an armature drivingly connected to said material being produced and a stationary field, a source of reference potential, a current amplifier for feeding the field of said first tachometer in series with the field of said second tachometer, said current amplifier being a transistor amplifier having an input stage adapted to respond to the difference between an input derived from the armature of said second tachometer and an input derived from said source of reference potential, and a coupling from the armature of said first tachometer to the input of the amplifier of said gauge signal for conveying a negative feedback signal proportional to the ratio between the power means speed and the material speed, said feedback signal tending to cancel the action of the gauge signal and thus causing the controller to be turned off and on so as to control the rate at which said correction is applied in a manner inversely proportional to the power means speed and directly proportional to the material speed, whereby to counteract the effect of transportation lag and thus maintain a servo-loop response in terms of correction applied in response to a given error substantially unaffected by the speed of the emerging material over a wide range thereof.

References Cited by the Examiner

UNITED STATES PATENTS 2,909,717  10/59  Hulls et al. _____ 80—56.1
3,045,222  7/62   Spergel _____ 340—213

FOREIGN PATENTS 607,961  11/60  Canada.

WILLIAM J. STEPHENSON, *Primary Examiner.*

LEON PEAR, *Examiner.*